UNITED STATES PATENT OFFICE.

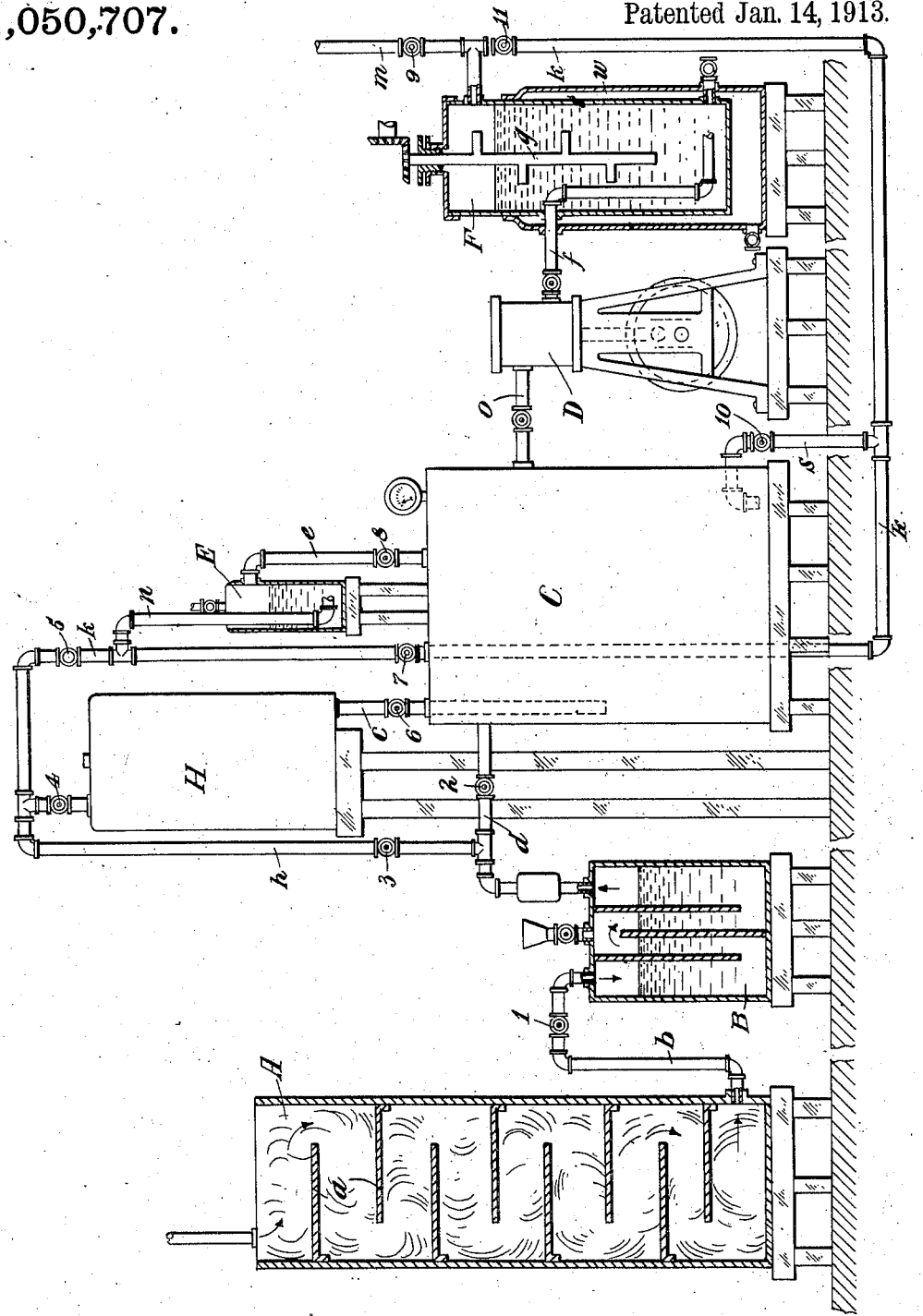

CARL WALTER VOLNEY, OF KEYPORT, NEW JERSEY; SARAH L. G. VOLNEY EXECUTRIX OF CARL WALTER VOLNEY, DECEASED.

PROCESS OF STERILIZATION OF LIQUIDS.

1,050,707.   Specification of Letters Patent.   Patented Jan. 14, 1913.

Application filed November 14, 1908. Serial No. 462,612.

*To all whom it may concern:*

Be it known that I, CARL W. VOLNEY, a citizen of the United States, residing in Keyport, in the county of Monmouth and State of New Jersey, have invented certain new and useful Improvements in Processes of Sterilization of Liquids, of which the following is a specification.

The object of the present invention is to provide a process for the effective and complete sterilization of liquids by the treatment of the liquid with a gas and subsequently washing out the gas from the treated liquid with another gas.

This invention is particularly applicable to the sterilization of milk by the use of a relatively small quantity of a germicide substance, and which process will also effectively and completely destroy not only all of the infusorial and bacterious or germ-like matters of the treated milk but will also completely remove from the substance the germicide employed and at the same time will not injure or affect in any manner the treated milk.

Although this invention may be used in the sterilization and treatment of various liquids yet its application to the sterilization of milk will be described in detail.

It is well known that infusorial organisms in milk are destroyed by heating and boiling, but it has also been found that effective sterilization requires a high degree of heat sustained for a considerable length of time and under such treatment denaturation and coagulation of protein matter, evaporation of volatile constituents and other undesirable changes are produced in the milk so that sterilization and disinfection at lower temperatures has always been held desirable. And it is also well known that by the application of antiseptic germ destroying matter to the milk sterilization may be effected at lower and at ordinary temperatures but that the use of such matters is limited and prohibited in a great measure by custom and law whenever any trace of the sterilizing or disinfecting matter remains in the milk imparting to the latter injurious or disagreeable qualities. From these considerations it follows that the application of germicide material to milk depends upon the non-injurious character of the germicides if there is any trace of these left in the milk after sterilizing, and on the condition of being completely removed from the same after sterilization. It is consequently indicated by these considerations, that the germicide or disinfecting matter for the milk should be of a gaseous or sufficiently volatile character, so that it can be removed readily after sterilization, and that it should not have any deleterious effect on the milk during its reaction on the infusorial organisms.

Although the hereinbefore mentioned infusorial matter consists usually of an infinite number of individuals, it would form, if all these individuals were collected, but an infinitely small portion of the mass; and it follows that a correspondingly small quantity of germicide necessary for its destruction would be likewise required. It is, however, known that the quantities of germ destroying matter with which organic material is usually treated, is greatly in excess of the quantity actually needed for the destruction of the comparatively small quantity of infecting or decomposing matter; and it will thereon be found, that this excess of germicide is used because, by the methods at present in use, the destroying medium could not be brought in thorough contact therewith throughout the proportionately large volume of matter to be sterilized.

It is the purpose of my invention to overcome these difficulties; to reduce the quantity of the germ-destroying matter on a rational basis, and to render it effective at the same time; and finally, after having effected the desired sterilization, to remove all traces of the disinfecting matter from the milk. To that end, I first diffuse a comparatively very small mass of carbon monoxid in a proportionally very large quantity or volume of a suitable indifferent gas, preferably atmospheric air, and then treat the milk with this volume of prepared air, causing it to pass through the liquid as many times as appears necessary to affect and destroy all the noxious infusorial matter. By these means, the intended contact and effect is secured, although the necessary quantity only, for the destruction of the infusorial organisms, is used. And after finishing the sterilization by this process I remove the comparatively small quantity of the sterilizing medium left therein from the milk by passing a suitable gas, such as sterilized air through the same at the proper temperature, causing it to be diffused with the passing air and carried off. In this process of removing the carbon monoxid, the same volume of sterilized air can be used over again, passing and repassing the liquid.

In the accompanying drawing is illustrated diagrammatically one form of apparatus by which the invention may be put in practice.

One form of apparatus for carrying out my present invention is shown in the drawing, in which the milk or other liquid to be treated is placed in a suitable vessel F. The atmospheric air that is used, is preferably first passed through a tank A having shelves $a$ containing a large amount of cotton, that serves to filter the air and also remove the germs therefrom. To sterilize this air, it is next passed through a tank B, that may be formed of lead and containing sulfuric acid; the air passing between the tanks through a pipe $b$. The treated air passes by pipe $d$ into a tank C, in which it is mixed with carbon monoxid in a gaseous form. The carbon monoxid may be placed in a suitable vessel H connecting with the tank C by pipe $c$. Or the germicide may be placed in a smaller tank E connected with the mixing tank C by a pipe $e$. The treated gas in the tank C is forced into the tank F by suitable means, such as an air pump B, connected with the tank C by a pipe $o$ and with the tank F by pipe $f$. A valve 1 is placed on the pipe $b$ between the tanks A and B, and a valve 2 on the pipe $d$ between the tanks B and C. A pipe $h$ leads from the pipe $d$ and connects with the tank H controlled by valves 3 and 4. A pipe $k$, leads from the tank H around to the top of the vessel F containing the substance to be treated, and contains a valve 5 adjacent the tank H, and a valve 11 adjacent the tank F. An outlet pipe $m$ leads from the tank F controlled by a valve 9. A valve 6 controls the pipe $c$, and a valve 7 is placed in the pipe $k$ beyond a pipe $n$ leading from the pipe $k$ into the vessel E. A pipe $s$ connects the lower part of the tank C with the pipe $k$, and is controlled by a valve 10.

In the operation of the apparatus, the air in tank C can be replaced by sterilized air, before the milk to be treated is placed in the vessel F, by closing valves 3, 6, 7, 8, 10 and 11, and opening the valves 1, 2, and 9. Upon starting the pump the air will be drawn out of tank C and forced through the tank F escaping through the pipe $m$. This will cause the atmospheric air to be drawn in through the vessel A, by which it will be filtered, and also drawn through the vessel B whereby it will be sterilized, which so treated air will remain in the vessel C when the pump is stopped. Thereupon the valves, 1, 2, 3, 8, 9 and 10 are closed, the valves 11, 7, 6, 5 and 4 are opened. When the pump is now started, the air from C will be forced into the tank F and through the milk therein, and will pass out of the same into the pipe $k$. The valves 11, 7, 5 and 4 being open, the air or gas will be forced back into the tank H and thence down through pipe $c$ into the tank C again, causing the carbon monoxid gas in H to pass through the tank C into the tank F where it is brought into intimate contact with the milk contained therein. If desired this action of the tank can be assisted by means of an agitator $g$, and this process will be further facilitated by means of a jacket $w$ that may have a circulation of warm water therein. By maintaining the action of the pump, a very small quantity of the carbon monoxid gas that was placed in the vessel H, will be repeatedly caused to pass through the substance in the tank F, so that the milk therein is repeatedly and continuously subjected to the action of the same small quantity of the carbon monoxid to destroy and remove the germs or bacteria in the milk. If the germicide by which the milk is treated, is in the form of a volatile liquid, it is placed in the tank E. In such case the valves 4 and 5 are closed and the valve 8 is opened. This will cause the gas driven back through the pipe $k$, to pass down into the tank E by pipe $n$ emerging at the bottom of this tank. The gas passes up through the liquid in the tank E and finds exit through the pipe $e$ leading from the top of this tank. When this step of the process has been carried on for a sufficient length of time, the valves 3, 6, 7, 8, 10 and 11 are closed, while valves 1, 2, and 9 are opened. This will cause the gas in the tank C, to be passed through the tank F and find exit through the pipe $m$, and therefore fresh quantities of air will be drawn in through tanks A, and B, replacing the germicide treated gas in C with fresh quantities of filtered and sterilized atmospheric air, that will be passed through the milk in the tank F. This latter process will serve to mechanically drive out the gaseous matter contained in the milk in the tank F and therefore effectually remove all of the carbon monoxid contained in the material treated. But this latter step of the process may be modified, in that as soon as the filtered and sterilized air finds exit through the pipe $m$, the valves 2 and 9, are closed while the valves 11 and 10 are opened. This will cause the gas to pass in the tank C through the tank F, and back through the pipes $k$ and $s$ into the tank C. By this means a comparatively small quantity of the filtered and sterilized gas can be repeatedly caused to pass or circulate through the milk in the tank F, and the carbon monoxid will be destroyed or treated whereby its deleterious qualities are removed, and also whereby it may be more easily extracted from the treated milk in the subsequent operation of driving the gas from the tank C through the tank F and out through the exit pipe $n$. From this it will be observed that the material in the tank F is first treated with a gas such as atmospheric air impregnated with carbon monoxid, which impregnated gas is caused to continuously circulate through the tank a desired number of times. Next, the milk is treated with another gas such as sterilized and filtered air, that is caused to pass through the tank; or else a small quantity of which may be caused to continuously circulate through the tank. And the final step in the process is driving through the milk in the tank, of air or other gas that has been filtered and sterilized whereby the carbon monoxid is effectually and completely removed from the milk or other substance treated.

I have discovered that carbon monoxid reacts on some of the proteids of bacterial protoplasm by displacing and removing therefrom oxygen and combining with such proteids. This reaction is especially noticeable when the carbon protoxid comes in contact with the fibrogene proteids produced from albuminous matter under bacterial agencies, such as globin and syntonin, and thereby destroying the bacteria. At the same time carbon monoxid does not affect the constituents of milk such as casein, butter fat, milk sugar or the albuminous matter of milk, reacting only on the fibrogene matter created under the influence of living bacteria. In the removal of the protoxid or monoxid from the milk, by passing filtered and sterilized air through it as described hereinbefore, the air takes up by diffusion any free monoxid gas as well as carbon dioxid gas, which may be formed by oxidation of the monoxid, and removes these from the matter treated as described, by the circulation of the air through the milk in the last stage of the process. Finally to the above indicated advantages of the described process has to be added, that the process avoids all waste of material by the use of a certain predetermined quantity of the germicide, this being applied recurrently until the desired effect is produced, and by its complete confinement in the apparatus, contact with the operators is completely avoided and any deleterious effect prevented.

Having thus described my invention, I claim:

1. The process which consists in subjecting a liquid to the action of a sterilizing gas and then expelling such sterilizing gas from the liquid with another gas.

2. The process which consists in sterilizing a liquid with a gas and then passing sterilized air through such liquid.

3. The process which consists in subjecting a liquid to the action of a germicide and then washing the germicide from the liquid with a sterilized gas.

4. The process which consists in subjecting milk to the action of a germicide and then expelling the germicide from the milk.

5. The process of treating milk which consists in passing through the milk a gas destructive of living impurities in the milk and then expelling the gas from the milk with another gas.

6. The process of treating milk which consists in passing through the milk a gas having an avidity for some chemical component of living impurities of milk, then passing another gas through the milk thereby removing the resultant of the combination of the first gas and impurities.

7. The process of treating milk which consists in subjecting the milk to the action of a germicide for removing from the milk the infusorial and bacterious, or germ-like matters, and then completely removing from the treated milk the germicide.

8. The process of sterilizing milk, consisting in taking a certain quantity of an indifferent gas containing a very small quantity of carbon monoxid relative to the quantity of the milk to be treated, repeatedly forcing said gases through and into intimate contact with the entire mass of the milk, and thereupon removing said gases from the treated milk by passing a suitable gas through the same.

9. The process of sterilizing milk, consisting in taking a certain quantity of an indifferent gas containing a very small quantity of carbon monoxid relative to the quantity of the milk to be treated, repeatedly forcing said gases through and into intimate contact with the entire mass of the milk and thereupon removing the said gases from the milk by passing filtered and sterilized air through the same.

10. The process of sterilizing milk, consisting in taking a certain quantity of a filtered and sterilized air containing a very small quantity of carbon monoxid relative to the quantity of the milk treated, and repeatedly forcing such germicide laden air through and into intimate contact with the entire mass of the milk.

11. The process of sterilizing milk, consisting in taking a certain quantity of a filtered and sterilized air containing a very small quantity of carbon monoxid relative to the quantity of the milk to be treated, repeatedly forcing such germicide laden air through and into intimate contact with the entire mass of the milk, and thereupon removing said gases from the milk by passing filtered and sterilized air through the same.

CARL WALTER VOLNEY.

Witnesses:
GEORGE W. BROWN,
HATTIE P. SIMMONS.